United States Patent [19]
Duren

[11] Patent Number: 5,593,331
[45] Date of Patent: Jan. 14, 1997

[54] MARINE MARKER

[75] Inventor: John J. Duren, West Bend, Wis.

[73] Assignee: Smith & Newphew Rolyan Inc., Germantown, Wis.

[21] Appl. No.: 497,806

[22] Filed: Jul. 3, 1995

[51] Int. Cl.$^6$ .................................................. B60L 11/02
[52] U.S. Cl. ................................................................ 441/6
[58] Field of Search ......................... 441/1, 6, 2, 7, 441/11, 21–23, 30, 32; 428/36.7, 35.4; 215/1 C; 114/266, 267, 357

[56] References Cited

U.S. PATENT DOCUMENTS

| | | | |
|---|---|---|---|
| 4,047,868 | 9/1977 | Kudo et al. | 425/133.1 |
| 4,743,479 | 5/1988 | Nakamura et al. | 428/36.7 |
| 4,816,304 | 3/1989 | Nohara et al. | 428/36.7 |
| 5,242,066 | 9/1993 | Kelsey | 215/1 C |
| 5,372,532 | 12/1994 | Robertson, Jr. | 441/1 |
| 5,425,470 | 6/1995 | Duhaime et al. | 428/36.7 |

FOREIGN PATENT DOCUMENTS 1527611  10/1978  United Kingdom ........... B29D 23/04

OTHER PUBLICATIONS

Catalogue 92B, Smith & Nephew Rolyan Inc., Buoys–Floats & Accessories, 1992; pp. 1–5, 18,19,cover.

*Primary Examiner*—Edwin L. Swinehart
*Attorney, Agent, or Firm*—Pravel, Hewitt, Kimball & Krieger

[57] ABSTRACT

A marine marker providing a service life, both of the structural rigidity as well as the surface finish that is presently unknown in the industry. The present invention utilizes the structural features of a high strength, readily formable plastic resin material in layers of high density polyethylene, nylon 6/6 and ethylene vinyl alcohol and employs a specialized manufacturing technique to provide a net shape of layered resin materials in the marker further enhancing its physical rigidity and serviceability. The invention further includes a protective surface unknown in marine markers with additional advantages to the application of the necessary informational messages on the marker, the addition of an ultra-violet protector and the providing of improved scuff-resistant outer surface.

10 Claims, 1 Drawing Sheet

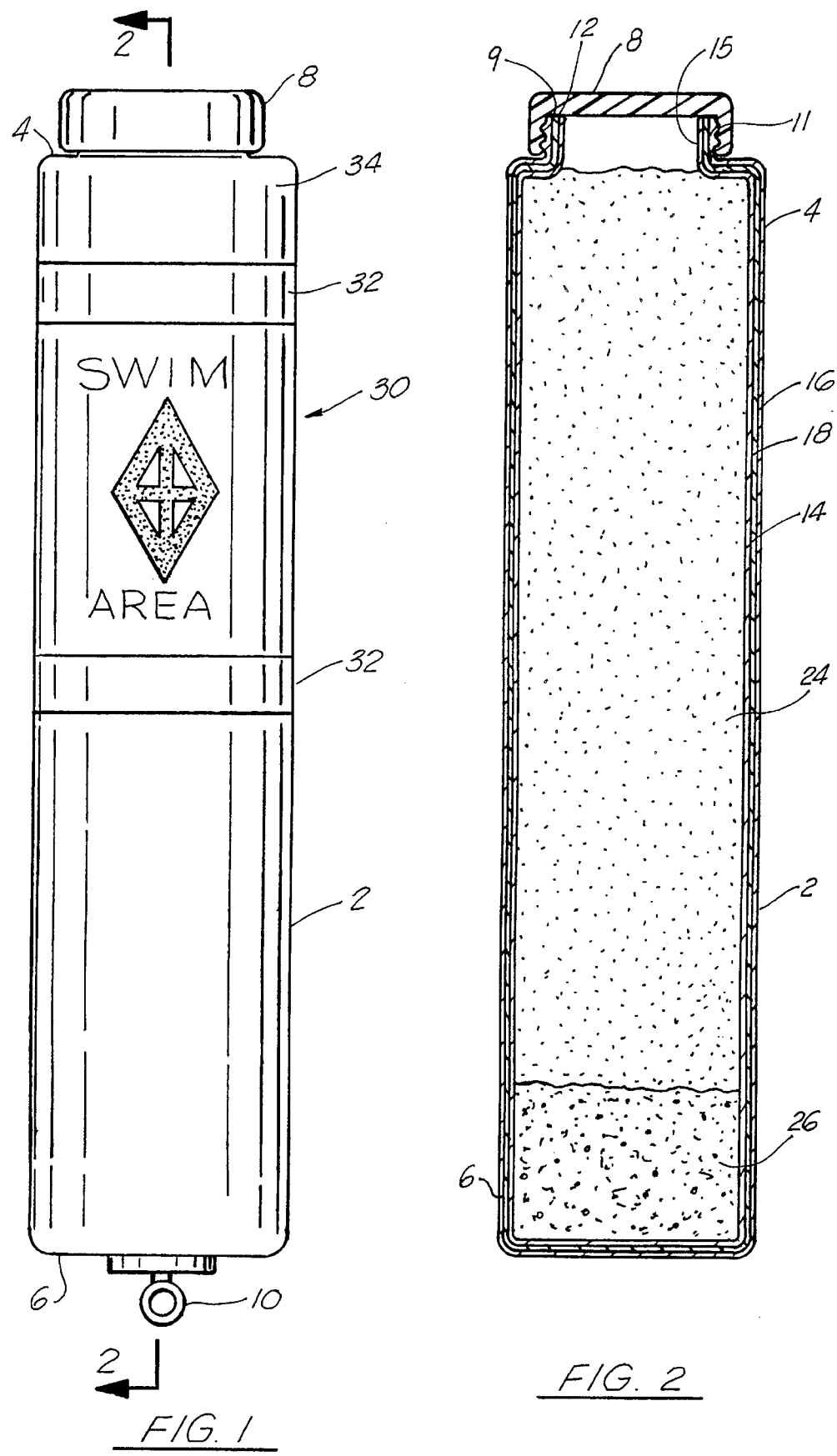

MARINE MARKER

BACKGROUND OF THE INVENTION

Marine markers are an important tool for the maintenance of commerce on navigable waterways. Their use is, among others, to identify navigable waterways that boat and ship operators might follow the safe water route in and out of a harbor or up and down an inland river. Pleasure craft rely upon marine markers to avoid hazardous areas in recreational waterways and safely operate in transit in coastal areas and inland rivers and lakes. Regulatory agencies including the U.S. Corps of engineers, Coast Guard, state and federal parks departments, sheriffs departments, harbor authorities and private entities including yacht clubs and resort enterprises utilize marine markers to establish safety and operating rules for use of these waterways.

Once placed, the marine marker is then continually relied upon to provide its informational role, irrespective of weather conditions. The marker is exposed to the vagaries of climate, storm, sun and the pounding of the physical environment in which it survives. The continuing exposure of the marker to the ultraviolet rays of sunlight is known to cause degradation of commonly used plastics. The continued bathing of the fresh and salt water environment either wears on the surface finish on the marker (including the illustrative/ informative message printed, painted or otherwise embodied thereon) or physically or chemically attacks the material of which the marker is constructed. While plastics materials provide relatively more chemical stability, the physical effects of the marker environment may have dictated the use of a metal or alloy thereof to provide effective longevity. Though the continued bombardment of the likes of waves, wash, rain, wind that marine markers endure are substantial, they are continually assaulted by the vessels traversing the waterways. Thus, in addition to surface stability against weather and sunlight, the marker must also have structural rigidity to withstand the battering intermittently imposed.

Where the physical integrity of a marine marker may provide several years of service, the environmental abuse may cause the informational messages to be obliterated or blurred, whereby the marker is non-functional. It is common practice to employ maintenance and restorative programs to ensure the functional operation of marine markers. Included in these functions are the cleaning of the markers to remove marine growth, repair of physical damage, restoration of faded or obliterated symbols, messages and marks or bands and refinishing the surface with a protective coating to prolong surface appearance and stability. Such programs include the application of such as vinyl labels and panels over the surface of the marker to replace the message or marking originally carried and subsequently applying a further protective coating to prolong the functionality.

Markers are conventionally fabricated of elements to be assembled as containers which are then filled with light weight materials such as a urethane foam for additional structural rigidity and buoyancy. Additionally, markers are conventionally provided with a nominal fill of a concrete or other heavy material to provide ballast and orientation to the marker as it floats in its anchored state. Prior art materials utilized for the manufacture of markers include high density polyethylene (HDPE), acrylonitrile-budatiene-styrene (ABS) and metal alloys treated to withstand the corrosive effects of the water environment.

Examples of such prior art marine markers are illustrated in a catalogue of such products available from Smith & Nephew Rolyan Inc., the assignee of the present invention.

SUMMARY OF THE INVENTION

The marine marker of the present invention provides a service life, both of the structural rigidity as well as the surface finish that is presently unknown in the industry. The present invention utilizes the structural features of a high strength, readily formable plastic material and employs a specialized manufacturing technique to proved a net shape of layered resin materials in the marker further enhancing its physical rigidity and serviceability. The invention further includes the advantage of additional layered, formable plastic material which provides a combination of important contributions to the overall serviceability of the marker. These add a protective surface unknown in marine markers with additional advantages to the application of the necessary informational messages on the marker, the addition of an ultra-violet protector and the providing of improved scuff-resistant outer surface.

The present invention includes the combination of an extruded container having a fundamental structural layer of high density polyethylene (HDPE) over which a layer of a particular nylon (Nylon 6/6) is co-extruded. The combination of layers is effectively bonded with an intermediate layer of an ethylene vinyl alcohol (EVOH). The combination of materials are combined by being extruded through separate heads of a multi-headed extruder into adjacent layers which form a parison which is blow molded in a process wherein the net shape formed is essentially the final shape of the marine marker to be placed in service. The additive manufacturing steps include the imprinting of the informational message through a printing operation such as that known as silk screening and the inclusion of a cap to seal the interior chamber and an attachment mechanism on the base of the marker by which it is anchored in a preferred location.

Additional embodiments of the invention include marine marker containers having additional structural layers of HDPE included in the extrusion process. In instances wherein the marker is expected to be subjected to sever physical/impact abuse, reinforcing of the HDPE layers may be appropriate. Since thickness of a particular layer may be a limitation of an extrusion process, such additional layers may be added, and up to eight layers have been included in markers manufactured according to the present design.

While layers of resin material (either HDPE or Nylon 6/6) of the most homogenous character are produced of "virgin" (not previously extruded) resin, it is permissible within the scope of the invention to include reground scrap material as is customary in the art to supplement the extruded material. In the present practice, the inclusion of such reground scrap may be in the order of 10% to 15% by weight.

BRIEF DESCRIPTION OF THE DRAWINGS

FIG. 1 is a front view of a marine marker according to the present invention.

FIG. 2 is a front sectional view of the marker of FIG. 1, taken along section line A—A of FIG. 1.

DETAILED DESCRIPTION OF THE PREFERRED EMBODIMENTS

Referring now to the drawings in general and in particular to FIGS. 1 and 2, there is illustrated a marine marker 2 having a top portion 4 and a bottom portion 6. Disposed on top portion is a cap 8 which is attachable in a variety of mechanisms. In the embodiment illustrated, cap 8 is adapted with internal screw threads 9 at the top portion 4 of marker 2. On the interface of top portion 4 cooperating with threads 9, external screw threads 11 threads may be molded, cut or rolled on marker neck 12. As should be appreciated by those skilled in the art, the container is thus provided with a neck finish having a diameter consistent with the marker shape. Other means of attaching top 8 on marker 2 may include gluing with an adhesive, ultrasonic welding or an articulating clamping means, as all are well known in the art.

Bottom portion 6 of marker 2 includes mooring loop means 10 for attaching marker 2 to anchoring means (not shown), such as a cable, to anchor marker in a selected location in a waterway. Mooring loop means 10 is fixed to the bottom portion 8 of marker 2 by means known in the art such that mooring loop means does not become detached during the foreseen rigors of the marker's service life in the waterway. As with cap means 8, eye loop means may be fixed to bottom portion 6 by bolting, welding or gluing as are currently used on such markers.

In accordance with the present invention, marker 2 is formed of successive layers of high density polyethylene (HDPE) 14 as may be available from E. I. du Pont Company, and Nylon 6/6 as may be available from Allied Signal Corporation, and of such commercial grade as is known to fabricators in blow molding processes. A intermediate, adhesive layer of ethylene vinyl alcohol material 18 as may be available from E. I. du Pont Company, is interposed between HDPE layer 14 and Nylon 6/6 layer 16 to ensure uniform bonding of the layers. In accordance with the invention and the fabrication of a marine marker having an outside diameter of 9 inches and an overall length of 61 inches, the respective wall thickness of marker 2 according to the present invention may be in the order of 0.075 inches to 0.100 inches, wherein the thickness of the HDPE layer is 0.060 inches and the respective layers of Nylon 6/6 may be on the order of 0.010 inches and the layer of EVOH is in the order of 0.005 inches. The thickness of the Nylon 6/6 layer may be minimized to the degree that a uniform continuous external cover of marker 2 is accomplished, however sufficiently thick to provide an effective barrier to ultra-violet (UV) light which might otherwise cause degradation of the HDPE material in layer 14.

The layers of HDPE 14, Nylon 6/6 16 and EVOH are extruded through separate heads in extrusion machinery as is illustrated in U.S. Pat. No. 4,047,868 and British Patent Specification 1,527,611. Additional layers of HDPE may be extruded adjacent the illustrated layer 14 in FIG. 2 of the present invention through additional heads as are illustrated in the references. After extrusion, the net shape of marker 2 is formed through the blow molding process as is described in the references and additionally in the treatise on the subject entitled Blow Molding Handbook, edited by Rosato and Rosato and published by Hanser Publications and available from Oxford University Press.

As is further illustrated in FIG. 2, marker 2 includes ballast material 26 disposed internally at the bottom portion 6. Conventional material is concrete, however any other heavy, stable material might be utilized. Above ballast 26, marker 2 is filled with a light weight urethane foam 24 or similar material. In order that marker retains buoyancy so as to float sufficiently high in the water that the contained informational message disposed on the exterior of marker, it is filled with such as the urethane foam thereby precluding the marker from filling with water and sinking should cap 8 become dislodged or its watertight seal broken, or the marker otherwise spring a leak through physical abuse of weather or watercraft. In the embodiment of marker illustrated and described, approximately 36 inches of upper marker surface is exposed with the inclusion of ballast, 5 pounds of anchor tackle and overall weight of the marker container and mooring eye. Various regulatory bodies such as the U.S. Coast Guard may require different top exposure and such is controlled in the marker by adjusting the relative amounts of ballast and buoyant materials.

That the marker 2 may fulfill its function as an information source, it is provided with a label 30 or other decoration. In the illustrated marker 2, it is provided with a conventional signage for indicating that the area marked by the presence of the marker is for swimming. It thus provides a warning to commercial and recreation boaters to avoid the area and to be alert for individuals in the water. As is well known in the marine industry, markers are utilized to mark channels for the entry and departures from harbors, hazards including submerged debris and artifacts, instructional messages including boat operating instructions (speed limits, etc.) and site identifications including marina entrances and the like. A uniform system of symbols has been adopted by regulatory agencies and are applied to such markers as ordered.

In the present embodiment, the decoration or informational messages are placed on markers 2 by a conventional silk-screening technique. Inks of the type suitable for decorating commercial plastics are effective for the placement of such messages on the outer Nylon 6/6 layer of marker 2. Ink suppliers offer formulations advantageous for particular resins. The outer layer 16 of Nylon 6/6 is specifically chosen as part of this invention because of the particular effectiveness of the material as both a suitable surface layer for the application of commercial grades of inks and the application of conventional vinyl, adhesive-backed labels without the need for other surface treatments. Prior art marine markers of HDPE exhibited a glossy surface which required surface conditioning of flame treating or equivalent prior to application of ink or labels. The present invention provides a nylon surface that readily accepts such inks and labels without prior treatment. Prior materials, HDPE in particular, required additional treatments including stabilizers or layers to protect the marker material from ultraviolet light protection. The inclusion of the nylon layer of the present invention provides a dual purpose by providing the UV protection in addition to the ready printing surface. The inclusion of the exterior provides a third advantage over prior art marine marker construction in that it provides an increased level of scuff resistance over materials previously used for markers. The combination of advantages thus provides vastly improved marker performance at a substantial reduction of manufacturing processes and costs.

These and other embodiments of the invention described and illustrated in the appended drawings are to be understood as inclusive and not exclusive and that various other forms and changes may be perceived without departing form the spirit and scope of the invention herein disclosed and claimed.

What is claimed is:

1. A marine marker for placement in a navigable body of water comprising:

a closeable elongated container of generally circular cross section between its two ends and having an opening at one end whereby said container may be filed with a buoyant material lighter than water;

ballast material disposed in the end of said container opposite said open end;

said container being constructed of multiple layers of resin material including an inner structural layer of high density polyethylene, an outermost layer of nylon and having therebetween a layer of ethylene vinyl alcohol;

and means for closing said container in watertight condition whereby said ballast material is maintained in water-free condition.

2. The marine marker according to claim 1 wherein said marker container includes additional layers of high density polyethylene resin material disposed in adjacent sequential layers on the interior of said container.

3. The marine marker according to claim 1 wherein said layer of high density polyethylene material is at least 0.060 inches thick.

4. The marine marker according to claim 3 wherein said layer of nylon resin material is at least 0.010 inches thick.

5. The marine marker according to claim 1 wherein said buoyant material is a gaseous material.

6. The marine marker according to claim 1 wherein said buoyant material is a urethane foam resin material.

7. The marine marker according to claim 1 wherein said marker container is of generally cylindrical shape and said closeable portion is disposed at the top of said cylinder.

8. The marine marker according to claim 1 wherein said high density polyethylene material consists essentially of virgin resin material.

9. The marine marker according to claim 1 wherein said high density polyethylene material consists of at least seventy percent by weight of virgin resin material and the remainder includes reground resin material.

10. A marine marker for placement in a navigable body of water comprising:

a closeable elongated container of generally polygonal cross section between its two ends and having an opening at one end whereby said container may be filled with a buoyant material lighter than water;

ballast material disposed in the end of said container opposite said open end;

said container being constructed of multiple layers of resin material including an inner structural layer of high density polyethylene, an outermost layer of nylon and having therebetween a layer of ethylene vinyl alcohol;

and means for closing said container in watertight condition whereby said ballast material is maintained in water-free condition.

* * * * *